United States Patent Office 2,895,678
Patented July 21, 1959

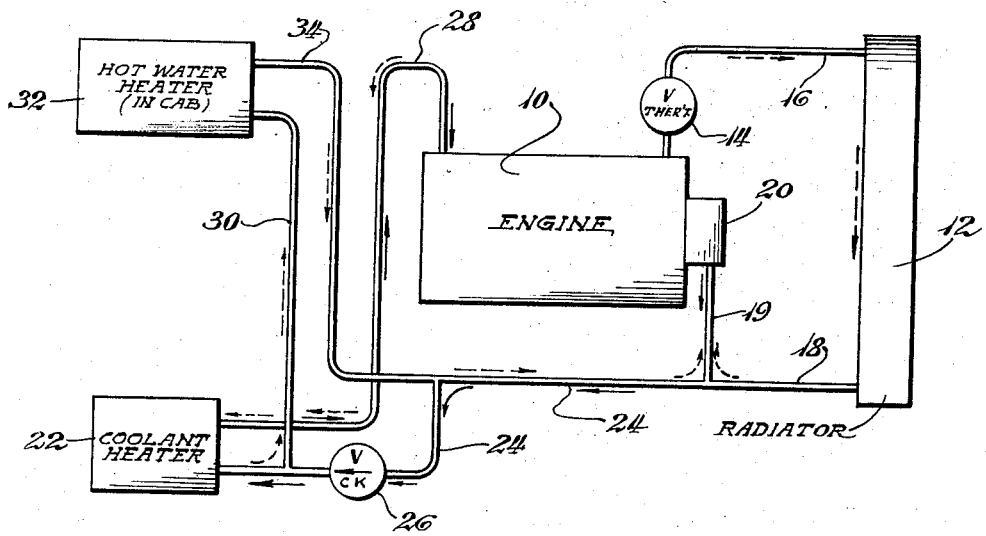

2,895,678

COOLANT AND PERSONNEL HEATING APPARATUS

Gordon J. Fairbanks, Donald A. Potter, and Jesse B. Mellett, Indianapolis, Ind., assignors to Stewart-Warner Corporation, Chicago, Ill., a corporation of Virginia Application January 23, 1956, Serial No. 560,751

2 Claims. (Cl. 237—12.3)

The invention relates generally to the method and means of heating the coolant liquid for the internal combustion engines of automotive vehicles, and for heating the driver's and passenger's compartments in such vehicles, utilizing in common a fuel combustion heater for supplying heat both to the coolant and to a passenger compartment heat exchanger, and controlling the supply of heat respectively to the coolant and the passenger compartment heaters.

In the operation of automotive vehicles, including particularly military passenger automobiles, trucks, busses, tanks, and other land and water vehicles powered by internal combusion engines, it is desirable, to improve cold weather starting, that the coolant, usually water with a freezing point depressant additive, be heated to a temperature which will facilitate starting and efficient operation of the internal combustion engine.

The present invention provides means for initially heating the coolant of an internal combustion engine for attaining the above mentioned result, and after the coolant has been raised to a temperature adequate for facilitating easy starting and efficient operation of the internal combustion engine, diverting the heat output of the coolant heater to a hot water heat exchanger in the cab or passenger compartment of the vehicle.

It is now the common practice of the Armed Forces to provide for the heating of the passenger compartments of vehicles by means of a combustion type heater in vehicles which are to be used in winter in areas in which the winter ambient temperature is not very low, as within the United States. When vehicles are to be used in an area in which arctic conditions may be encountered, that is, in which the ambient temperature might possibly be lower than minus 20° F., a second combustion heater is provided to heat the engine to facilitate starting. Such additional heater may be used as a standby to maintain the engine of the vehicle at a temperature which makes it easy to start, or may be used to preheat the coolant of the engine shortly prior to the expected use of the vehicle.

It has been suggested that vehicles intended for use in the United States, or in areas having a similar winter climate, be equipped with the less costly conventional hot water heater in which the engine coolant is circulated through a heat exchanger which includes a motor driven fan or ram for causing the flow of air through the heat exchanger into the passenger compartment, or for recirculating the air in the passenger compartment. However, if such conventional hot water heating system were employed and it was necessary to transfer the vehicle to an arctic area where temperatures as low as, or lower than, minus 20° F. might be encountered, it would be necessary to remove the complete hot water heating system and install two combustion heaters, one for preheating the engine and the other for heating the passenger compartment, which would be a very costly changeover.

It is the purpose of this invention to provide an apparatus and system whereby the changeover or conversion from a simple hot water heater for heating the passenger compartment to a heating system for both the passenger compartment and coolant, may be accomplished easily and at low cost, to condition the vehicle for use in arctic regions.

By the employment of the present invention, a hot water heater of the more or less conventional construction, and deriving heat from the engine coolant, may initially be installed in all military vehicles and when the vehicle is to be conditioned for an arctic climate, an internal combustion booster heater may easily be added to provide heat both for the engine coolant and for the personnel compartment, to make the vehicle satisfactory for operation under arctic conditions.

It is thus one of the objects of the invention to provide a vehicle heating system in which (1) the coolant of the engine cooling system of the vehicle may be maintained at a temperature suitable for quick starting of the engine, either by operating a combustion heater at a relatively low heat output rate or by intermittent operation thereof under thermostatic control responsive to the temperature of the coolant; or (2) after the engine has been shut down for a long period of time under arctic temperature conditions, will supply a relatively large amount of heat to the engine in order to preheat the engine to facilitate starting; or (3) after the engine has been started, will add heat to the coolant in order to bring the engine up to its efficient operating temperature more quickly; and (4) will permit use of the hot water heater in the vehicle cab or passenger compartment, both soon after the engine has been started and at a higher level of heat output after the engine temperature has been stabilized.

A further object is to provide heat generating means for heating the coolant of an internal combustion engine to facilitate starting thereof, and when the coolant is at a temperature which is efficient for the operation of the engine, to cause the flow of some of the coolant through the heat generator to a customary hot water heater (heat exchanger) in the cab or passenger compartment of the vehicle. The heat output of the hot water heater is therefore much greater than would be the case if it were supplied with heat derived solely from the engine.

A further object is to provide an improved means and method for automatically attaining the previously described objects.

Other objects will appear from the following description, reference being had to the accompanying drawing which shows a block and flow diagram of an exemplary form of the apparatus used for attaining the above objects.

Basically, the system includes an internal combustion engine 10 of an automotive vehicle having a cooling system comprising a radiator 12 connected to the outlet of the water jacket of the engine 10, the flow being controlled by a thermostat 14 in a hose or conduit 16, the return of the coolant from the radiator 12 being through conduits 18 and 19 and a water pump 20. These parts constitute the customary internal combustion engine cooling system.

In order to preheat the coolant liquid, there is provided a coolant heater 22 which is connected to the conduit 18 through a conduit 24 and a check valve 26, so that prior to starting the engine the coolant may flow from the pump 20 (and partly from the bottom of the radiator 12, provided thermostatic valve 14 is partially open) through conduits 18 and 24 and check valve 26 to the heat exchanger of the coolant heater 22 and be discharged through a conduit 28 to the top of the water jacket of the engine 10. For the purpose of simplicity this is preferably a thermosyphon flow, although, if desired, a small pump may be provided for starting and maintaining such flow.

When the engine is cold the thermostatic valve 14 will be closed and the coolant will flow in a reverse direction through the pump 20 and conduits 19 and 24 and check valve 26 to the coolant heater 22, indicated by the full line arrows. Thus all the heat generated by the heater 22 will be utilized to raise the temperature of the coolant to an extent that the starting of the engine is facilitated.

However, after the engine has been started and the temperature of the coolant raised sufficiently for efficient operation of the engine, the thermostatically controlled valve 14 will open and the coolant will flow in the paths indicated by the dotted line arrows, that is, not only through the radiator 12 as circulated in the normal manner by pump 20, but also from the top of the water jacket of the engine through the conduit 28, coolant heater 22, and through a conduit 30 to the hot water-air heat exchanger 32 in the cab or passenger compartment of the vehicle. From this heat exchanger the coolant will flow through conduits 34, 24, and 19 to the water pump 20 for recirculation in the system. When the engine is in operation the check valve 26 will prevent flow from the coolant heater 22 through the conduit to the inlet of the water pump 20 because of the pressure differential across the valve established by the pump.

It will be observed that all of the elements of a conventional hot water vehiclet heater are retained, and that by the addition of the coolant heater 22 and check valve 26, and a few changes in the conduit and hose connections, a vehicle having a hot water heating system built for operation in temperate climates may be readily adapted for use in severe arctic climates.

When used as a standby heater to maintain the engine sufficiently warm for quick starting, the coolant heater 22 is provided with a thermostatic on-off control, or is of a type the rate of heat output of which may be modulated. If standby operation of the coolant heater is not required, such thermostatically controlled means for reducing the heat output of the coolant heater will not be necessary, and normally the economy effected by such means for reducing heat output will not be sufficient to warrant the installation of such thermostatic control.

After the engine is raised to a temperature suitable for efficient operation, the coolant temperature is raised and the heat output thereof is utilized mainly in raising the temperature of the coolant supplied to the hot water heater 32 in the cab of the vehicle.

In such systems it is desirable to locate the coolant heater 22 in a position to produce the most effective thermosyphon flow through the water jacket of the engine when it is not in operation, and through the hot water heater when the engine is in operation.

While we have shown and described the preferred embodiment of our invention, it will be apparent that numerous variations and modifications thereof may be made without departing from the underlying principles of the invention. We therefore desire, by the following claims, to include within the scope of the invention all such variations and modifications by which substantially the results of the invention may be obtained through the use of substantially the same or equivalent means.

We claim:

1. In an automotive vehicle having an internal combustion engine provided with a jacket for the circulation of a liquid coolant therethrough, a radiator, a liquid pump driven by the engine, a coolant heater of the combustion type, a hot liquid heater including a heat exchanger positioned within the passenger compartment of the vehicle for heating the compartment, means operative automatically prior to the operation of the engine to connect in a hydraulic circuit the coolant heater, the jacket and pump with coolant flow being in a direction opposite to the pumping direction of said pump and operative automatically upon operation of the engine to connect said pump, coolant heater, hot liquid heater and jacket in a hydraulic circuit with the direction of the coolant flow being in the pumping direction, and valve and conduit means connecting the pump and radiator in a hydraulic circuit that is completed in response to elevation of the coolant temperature to a satisfactory engine operating value.

2. Apparatus as claimed in claim 1 wherein said automatic means comprises a check valve positioned in the liquid coolant path between said pump and said coolant heater, whereby said check valve allows liquid coolant to flow from said pump to said coolant heater within said path but prevents reverse flow.

References Cited in the file of this patent

UNITED STATES PATENTS

| | | |
|---|---|---|
| 2,507,643 | Oaks | May 16, 1950 |
| 2,617,399 | Backus | Nov. 11, 1952 |
| 2,726,042 | Baier | Dec. 6, 1955 |